(12) United States Patent
Ikawa et al.

(10) Patent No.: US 8,254,220 B2
(45) Date of Patent: Aug. 28, 2012

(54) OBJECTIVE LENS ACTUATOR

(75) Inventors: Yoshihiro Ikawa, Osaka (JP); Mamoru Morita, Osaka (JP)

(73) Assignee: Panasonic Corporation, Osaka (JP)

( * ) Notice: Subject to any disclaimer, the term of this patent is extended or adjusted under 35 U.S.C. 154(b) by 334 days.

(21) Appl. No.: 12/482,932

(22) Filed: Jun. 11, 2009

(65) Prior Publication Data

US 2009/0310448 A1    Dec. 17, 2009

(30) Foreign Application Priority Data

Jun. 12, 2008 (JP) ................... 2008-153822
Jun. 4, 2009 (JP) ................... 2009-134560

(51) Int. Cl.
*G11B 7/00* (2006.01)

(52) U.S. Cl. .............. 369/44.15; 369/44.21; 369/44.22; 369/53.19; 369/244.1

(58) Field of Classification Search ............... 369/44.15, 369/44.22, 44.21, 53.19, 244.1
See application file for complete search history.

(56) References Cited

U.S. PATENT DOCUMENTS

| | | | | |
|---|---|---|---|---|
| 5,724,197 | A * | 3/1998 | Barnes et al. ................. | 359/824 |
| 6,480,460 | B1 * | 11/2002 | Ohkuma et al. ............... | 369/246 |
| 6,621,618 | B1 * | 9/2003 | Kaaden et al. ................ | 359/298 |
| 2002/0021651 | A1 * | 2/2002 | Hong et al. ................... | 369/112.23 |
| 2005/0078570 | A1 * | 4/2005 | Kabasawa .................... | 369/44.15 |
| 2007/0171775 | A1 * | 7/2007 | Iwamoto ...................... | 369/44.15 |

FOREIGN PATENT DOCUMENTS

| | | |
|---|---|---|
| JP | 10-289455 | 10/1998 |
| JP | 2001-52357 | 2/2001 |
| JP | 2001-084617 | 3/2001 |
| JP | 20003-513395 | 4/2003 |
| JP | 2006-134411 | 5/2006 |

OTHER PUBLICATIONS

Machine translation of Japan 10-289455 on Feb. 10, 1998 by Kono Noriyuki.*
Machine translation JP-2001067694 publish Mar. 16, 2001 by Hori, Kenichi.*

* cited by examiner

*Primary Examiner* — Wayne Young
*Assistant Examiner* — Linh Hoffner
(74) *Attorney, Agent, or Firm* — Hamre, Shumann, Mueller & Larson, P.C.

(57) ABSTRACT

In an objective lens actuator of an optical disk drive and the like, variations in the fixed end positions of wires serving as suspensions are reduced and tilt characteristics are improved. Terminal plates 20 fixed to a lens holder are tilted relative to wires 13 for supporting the lens holder with elasticity, and are soldered at the edges of the terminal plates 20, so that variations in the fixed end positions of the wires 13 are reduced.

3 Claims, 8 Drawing Sheets

OBJECTIVE LENS ACTUATOR

FIELD OF THE INVENTION

The present invention relates to an objective lens actuator and particularly relates to an objective lens actuator used for an optical pickup device and the like of an optical disk drive for irradiating a disk, which is a disk-like recording medium, with a light beam to optically record and reproduce information.

BACKGROUND OF THE INVENTION

An optical pickup device is used for an optical disk drive which irradiates a disk such as a CD, a DVD, a Blu-ray disc, and an HD-DVD disc with a light beam spot to record and reproduce information made up of pit strings on the recording surface of the disk. An optical pickup device has an objective lens actuator for driving an objective lens used for forming a light beam spot.

In recent years, an optical disk drive focuses a light beam spot by using an objective lens having a high numerical aperture (high NA) and records and reproduces data having been recorded with high densities. Thus, objective lenses having small inclinations relative to disks have been demanded.

In other words, regarding an objective lens actuator, a smaller tilt and a smaller reduction in the aberration of a light beam spot have been demanded. A tilt is a rotary motion made beyond a focusing direction and a tracking direction when a lens holder for holding an objective lens is driven.

Japanese Patent Laid-Open No. 2006-134411 discloses an optical pickup device for reducing a tilt, which is a rotary motion made other than a focusing direction and a tracking direction when a lens holder is driven, along with the configuration of a typical objective lens actuator.

First, the configuration of the typical objective lens actuator will be described below in accordance with an accompanying drawing. FIG. 7 is a perspective view showing the typical objective lens actuator according to the prior art. As shown in FIG. 7, an objective lens 51 is held by a lens holder 52, on which terminal plates 53 are fixed.

A fixed substrate 59 is fixed on a fixed part 57. One end 54b of each of a plurality of wires 54 serving as suspension members is fixed by soldering with solder 56. The other end 54a of each of the plurality of wires 54 is fixed to the terminal plates 53 by soldering with solder 55.

The objective lens 51, the lens holder 52 and the terminal plates 53 are formed integrally and constitute a moving part while being supported by the fixed substrate 59 with elasticity through the wires 54. The fixed part 57 has gaps serving as gel holder parts 58. The gaps are filled with damping gel, and the damping gel damps the primary mode vibration of the moving part.

The moving part including the lens holder 52 can be driven in the direction of arrow Fo which is a focusing direction and in the direction of arrow Tr which is a tracking direction. The fixed part has a magnetic flux supply device (not shown) made up of a magnet and a yoke, and a plurality of coils (not shown) are fixed on the lens holder. By energizing the coils through the plurality of wires 54, the objective lens 51 can be driven in a desired direction.

Generally, as shown in FIG. 7, the terminal plates 53 are disposed in parallel with the extension direction of the wires 54. A distance from the end of the solder 55 provided on the terminal plates 53 to the end of the fixed substrate 59 is an effective length L of the plurality of wires 54.

The terminal plates 53 have lands for energizing the ends of the coils (not shown). The state of the lands is shown in FIGS. 8 and 9. FIG. 8 is a side view showing the terminal plate of the prior art. FIG. 9 is a simplified plan view showing the shape of solder on the terminal plate of the prior art.

As shown in FIG. 8, the wires 54 are fixed to the terminal plate 53 by soldering with the solder 55 at a predetermined pitch P. On the terminal plate 53, the lands for energizing the ends of the coils are formed and solder 60 is provided on each of the lands. In this configuration, the terminal plate 53 and the wires 54 are disposed in parallel with each other (disposed in parallel in plan view, to be specific, the surface of the terminal plate 53 and the extension direction of the wires 54 are in parallel with each other). Thus as shown in FIG. 8, the lands are disposed such that the wires 54 and the solder 60 do not intersect each other in side view. In other words, the pitch P between the wires 54 is determined so as to secure a space for the solder 60 for energizing the ends of the coils (not shown).

As shown in FIG. 9, the solder 55 and the solder 60 are formed so as to protrude on the terminal plate 53. Further, the end face position of the substantially hemispherical shape of the solder 55 varies with fluctuations in the amount of solder during soldering and the variations result in a variation ΔL in the effective lengths L of the wires 54.

The foregoing explanation described the configuration of the typical objective lens actuator according to the prior art. In Japanese Patent Laid-Open No. 2006-134411, a technique using a conductive adhesive is disclosed instead of a fixing method using the solder 55 and the solder 56. The main configuration is substantially the same.

DISCLOSURE OF THE INVENTION

However, when the wires 54 acting as suspensions are fixed to the terminal plates 53 by soldering, it is difficult to stabilize the height of the solder 55 and the variation ΔL occurs in the effective lengths of the wires 54.

Thus in the typical objective lens actuator of the prior art in FIG. 7, variations in the effective lengths of the plurality of wires 54 cause a spring constant to fluctuate, so that a tilt occurs when the lens holder 52 is driven in the focusing direction Fo or in the tracking direction Tr. As a result, the aberration of a light beam spot is reduced.

Moreover, an objective lens actuator of an optical pickup device to be mounted in a notebook computer is strictly restricted in height and thus the thickness of the configuration has to be reduced at the same time.

The present invention has been devised under these circumstances. An object of the present invention is to provide an objective lens actuator which can reduce variations in the effective lengths of wires during soldering, hardly causes a tilt when a displacement is made in a focusing direction or a tracking direction, and is suitable for a low-profile device.

In order to solve the problem, an objective lens actuator of the present embodiment includes: an objective lens for focusing a light beam on a disk; a lens holder for holding the objective lens; terminal plates fixed to the lens holder; a fixed part; and a plurality of wires each having one end fixed to the terminal plates with a fixing agent and the other end fixed to the fixed part, wherein the terminal plates are fixed to the lens holder while being tilted by an angle relative to the wires, and the plurality of wires are fixed at the edges of the terminal plates with the fixing agent.

With this configuration, the effective lengths of the wires are restricted at the edges of the terminal plates. Even when the amount of the fixing agent such as solder is changed, the fixing agent such as solder reaches only the edges at the portions of the edges and thus the effective lengths of the wires are distances to the edges of the terminal plates, thereby reducing variations in the effective lengths of the wires. Moreover, the terminal plates are tilted relative to the wires. Thus even when the terminal plates have the solder for connecting the ends of coils, the solder does not come into contact with or intersect the wires, so that a pitch between the wires can be reduced and the objective lens actuator can be reduced in thickness in the focusing direction.

Further, the angle for tilting the terminal plates is 10° to 45°.

By tilting the terminal plates by at least 10°, it is possible to prevent a reduction in operating efficiency and the occurrence of problems. In other words, when the predetermined angle is less than 10° on the terminal plates having the solder for connecting the coils, the solder for connecting the coils and the wires may come into contact with each other or may be close to each other, so that it may become difficult to cut unnecessary portions at the ends of the wires and the workability may decline. Alternatively, positions for connecting the wires and the terminal plates may be displaced and cause problems. By tilting the terminal plates by at least 10°, such problems can be prevented. By tilting the terminal plates by 45° or less, the fixing agent such as solder and the wires can be connected to each other reliably. In other words, when the predetermined angle is larger than 45°, the fixing agent such as solder protruding on the tilted terminal plates may cover the wires with an extremely small area or the fixing agent and the wires may not come into contact with each other, whereas when the terminal plates are tilted by 45° or less, it is possible to prevent such problems.

As has been discussed, the objective lens actuator of the present embodiment can improve the positioning accuracy for soldering the wires at the edges of the terminal plates and reduce variations in the effective lengths of the wires.

As a result, a tilt occurring during the driving of the lens holder is reduced and it is possible to provide an objective lens actuator that hardly reduces the aberration of a light beam spot.

Further, according to the objective lens actuator of the present invention, a pitch between the wires can be reduced by tilting the terminal plates relative to the wires, so that the objective lens actuator can be reduced in thickness in the focusing direction and can be suitable for a low-profile device.

DESCRIPTION OF THE EMBODIMENT

The present embodiment will be described below with reference to the accompanying drawings.

Figure 1:
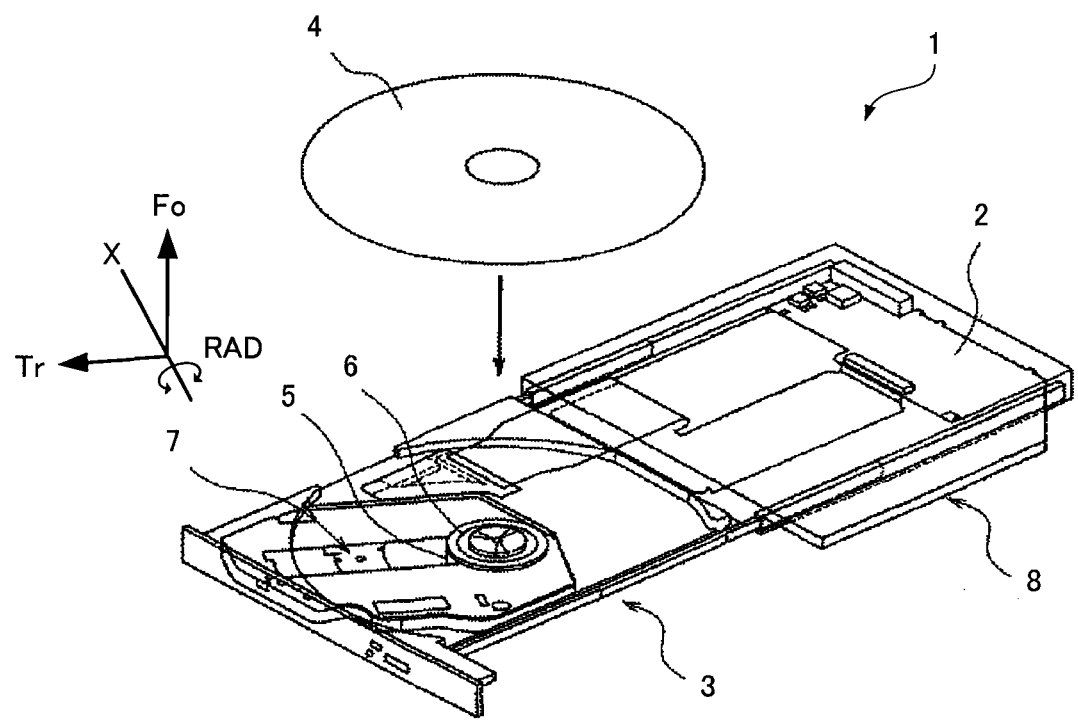
FIG. 1 is a perspective view showing an optical disk drive including an objective lens actuator according to an embodiment of the present invention.

FIG. 1 is a perspective view showing an optical disk drive including an objective lens actuator according to the present embodiment.

As shown in FIG. 1, an optical disk drive 1 is made up of a body case 8 that includes a control circuit board 2 for performing various kinds of control and a traverse unit 3 that can extend and retract from the body case 8.

The traverse unit 3 includes a spindle motor 5 for rotationally driving a disk (optical disk) 4, which is a disk-like recording medium, and an optical pickup device 7 for irradiating the disk 4 with a light beam spot to optically record and reproduce information. The disk 4 can be rotated while being chucked on a turntable 6 provided on the spindle motor 5. In the traverse unit 3, the optical pickup device 7 is disposed so as to move in a tracking direction which is the radial direction of the disk 4, that is, in the direction of arrow Tr.

In FIG. 1 and FIGS. 2, 3 and 5, which will be described later, arrow Fo indicates a focusing direction for focus control on an objective lens 11 (see FIGS. 2 to 5) provided on the optical pickup device 7. Further, arrow RAD around the X axis (tangential direction) perpendicular to the arrow Fo direction and the arrow Tr direction is a radial tilting direction, which is the rotation control direction of the objective lens 11 provided on the optical pickup device 7.

The optical pickup device 7 of the optical disk drive 1 irradiates the disk 4 with a light beam spot through the objective lens 11 and controls the position of the objective lens 11 in the focusing direction, the tracking direction, and the radial tilting direction based on a control signal of the control circuit board 2 when information is recorded or reproduced from the disk 4.

Figure 2:
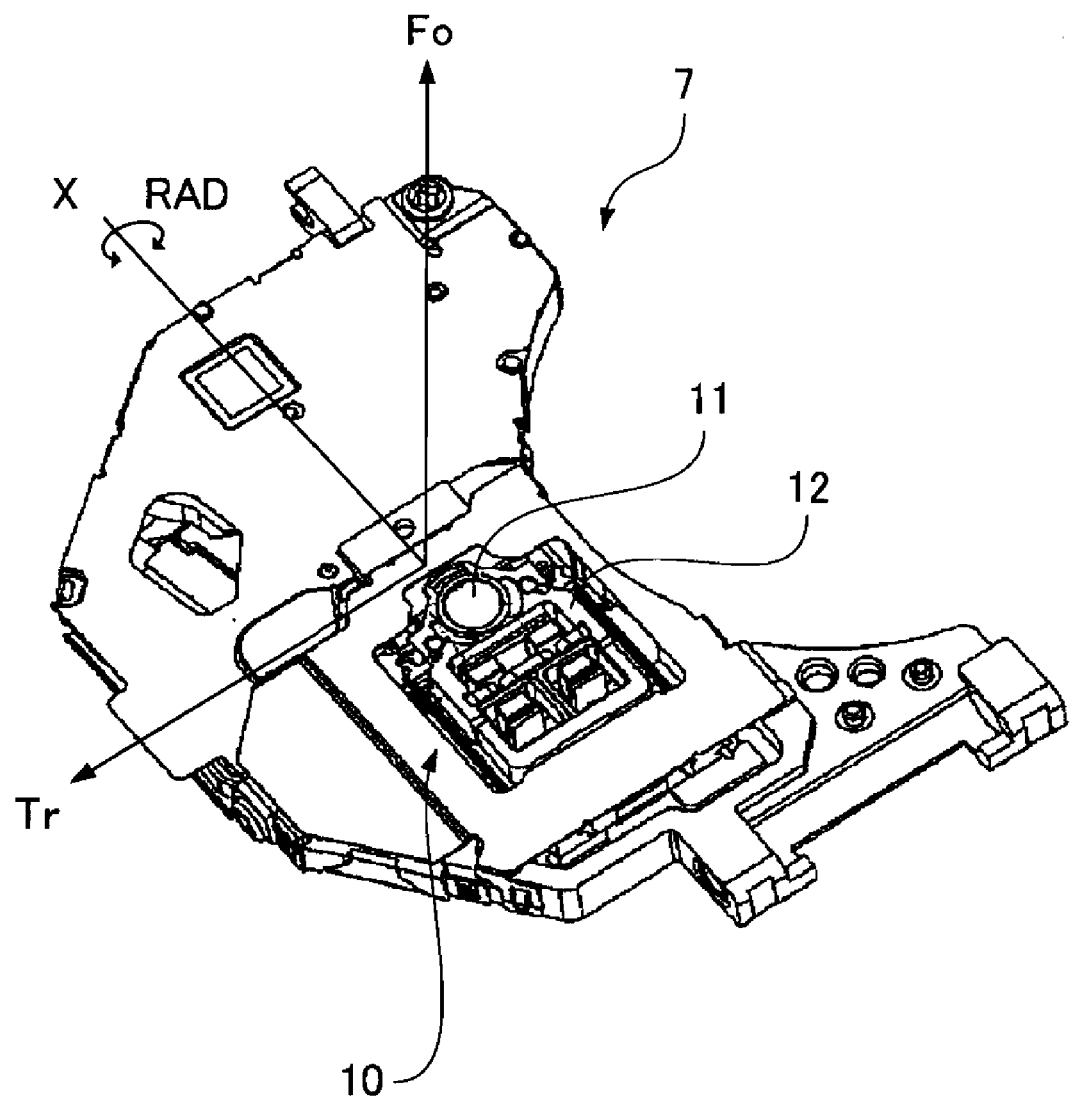
FIG. 2 is a perspective view showing an optical pickup device including the objective lens actuator.
Figure 3:
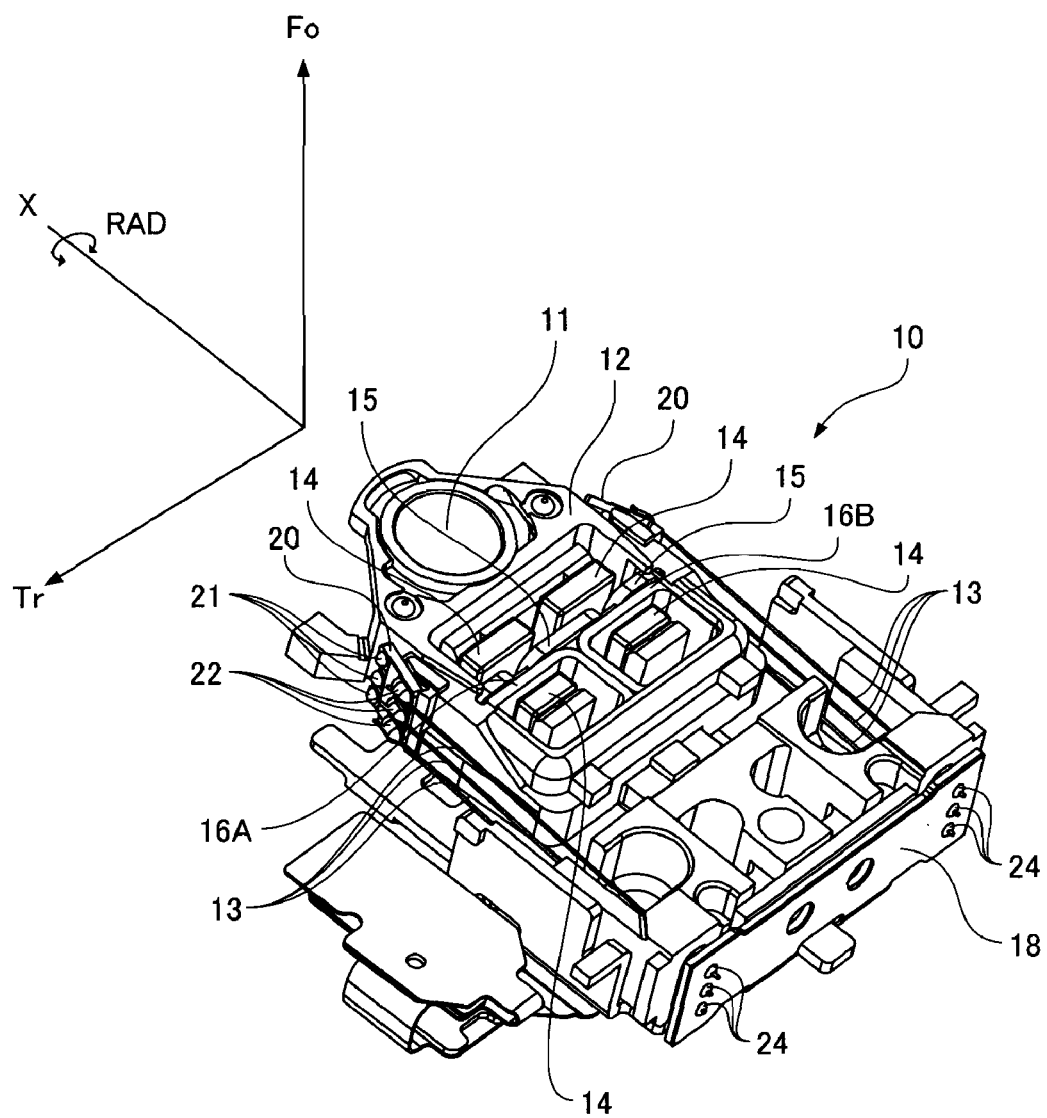
FIG. 3 is a perspective view showing the objective lens actuator.
Figure 4:
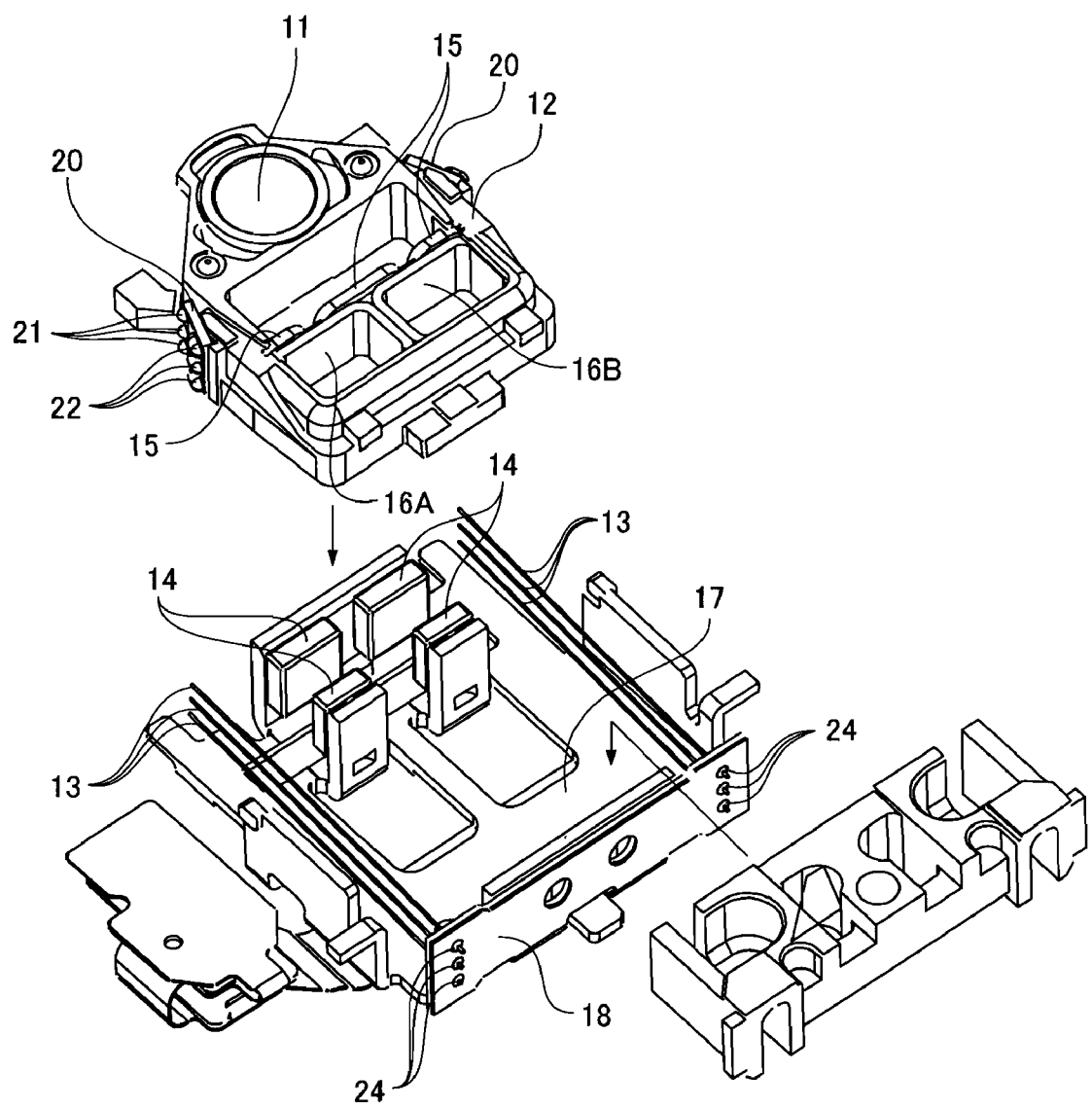
FIG. 4 is an exploded perspective view showing the objective lens actuator.
Figure 5:
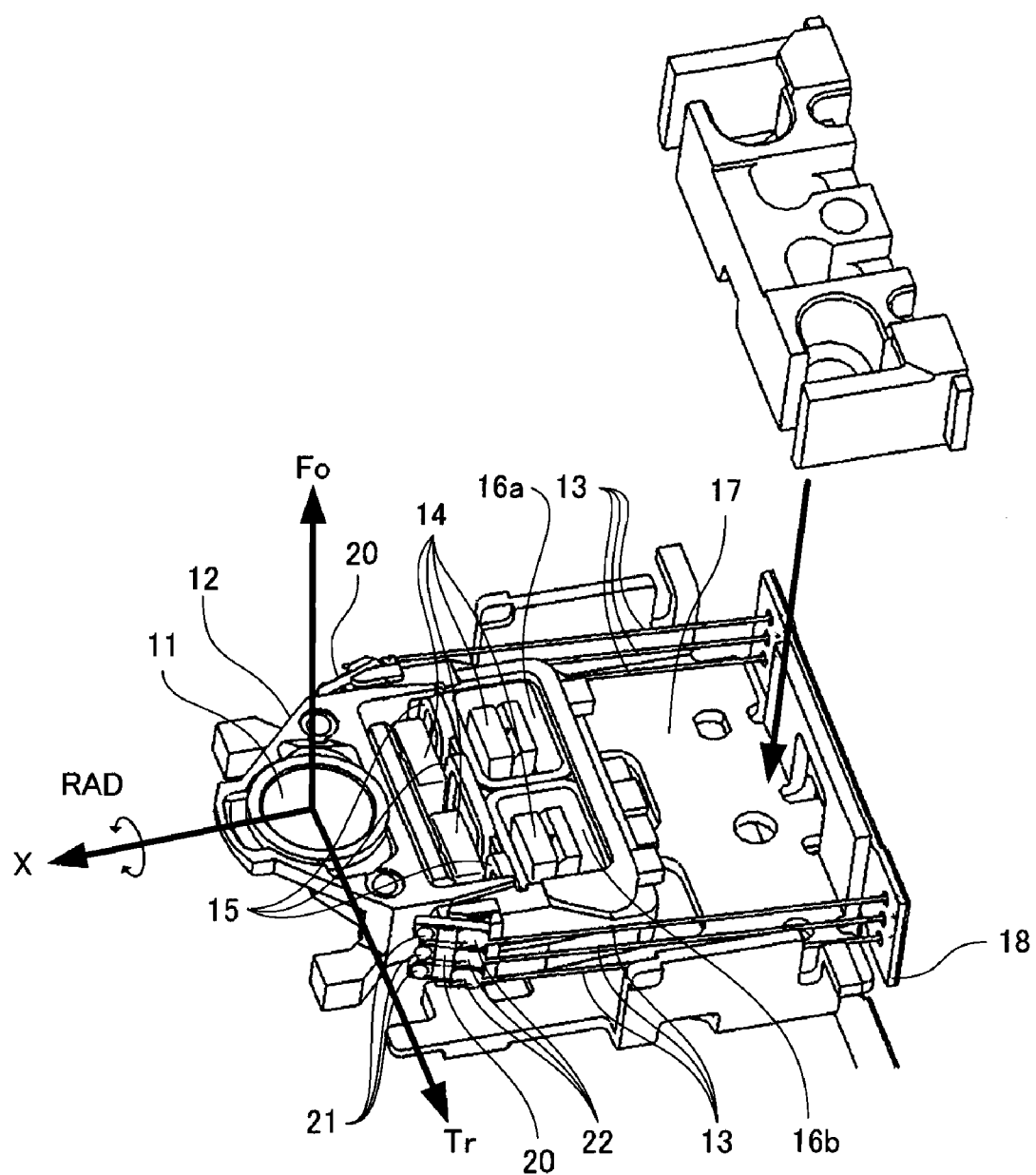
FIG. 5 is an exploded perspective view showing the objective lens actuator.
Figure 6:
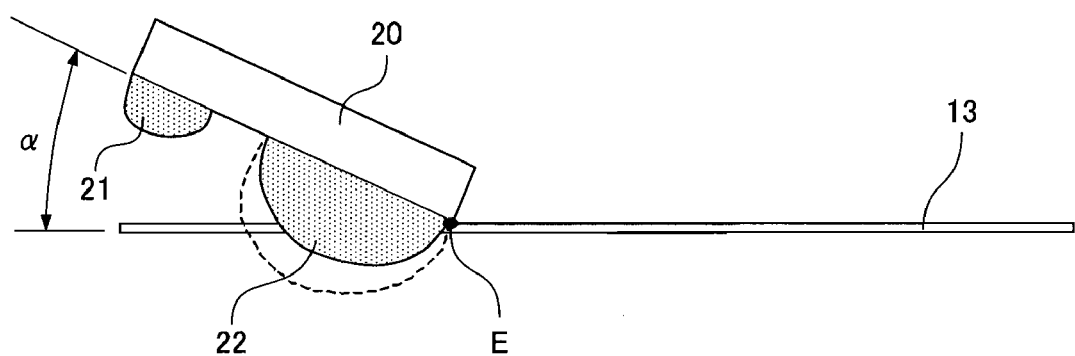
FIG. 6 is a schematic diagram showing a soldering state of a terminal plate of the objective lens actuator.
Figure 7:
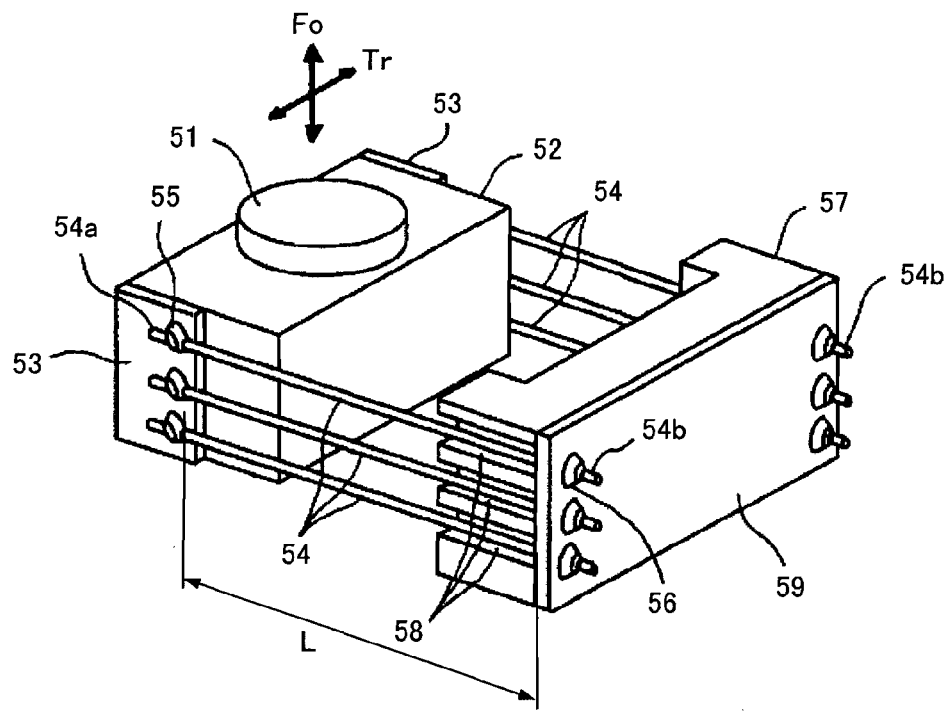
FIG. 7 is a perspective view showing a typical objective lens actuator according to the prior art.
Figure 8:
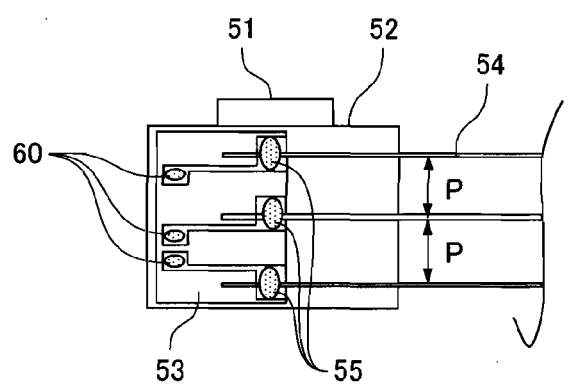
FIG. 8 is a side view showing a terminal plate of the prior art.
Figure 9:
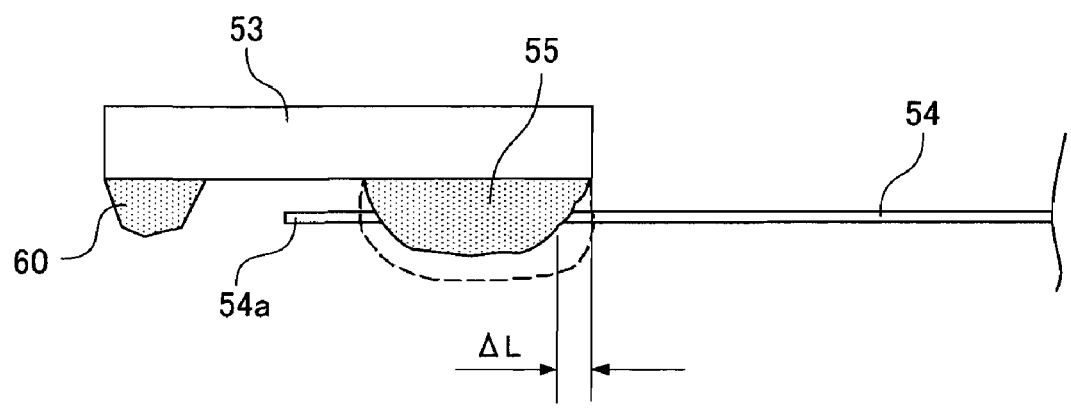
FIG. 9 shows a soldering shape of the terminal plate according to the prior art.

FIG. 2 is a perspective view showing an optical pickup device including the objective lens actuator. FIG. 3 is a perspective view showing the objective lens actuator. FIGS. 4 and 5 are exploded perspective views showing the objective lens actuator. FIG. 6 is a schematic diagram showing a soldering state of a terminal plate of the objective lens actuator.

As shown in FIGS. 2 to 4, the objective lens 11 is held by a lens holder 12 and the lens holder 12 has terminal plates 20 fixed thereon. On a yoke base 17 serving as a fixed part, a fixed substrate 18 is fixed. A plurality of wires 13 serving as suspension members each have one end fixed by soldering with solder 24 and have the other end fixed by soldering to the terminal plates 20 with solder 22.

The objective lens 11, the lens holder 12, and the terminal plates 20 are fixed integrally to one another. The objective lens 11, the lens holder 12, and the terminal plates 20 are supported by the fixed substrate 18 with elasticity through the wires 13, and constitute a moving part. In other words, the moving part made up of the objective lens 11, the lens holder 12 and the terminal plates 20 is supported with elasticity by the yoke base 17, which is an example of a fixed part, the moving part being movable in the focusing direction, the tracking direction, and the radial tilting direction through the wires 13.

The lens holder 12 includes tracking coils 15, a focusing coil 16A, and a focusing coil 16B. The tracking coils 15 and the focusing coils 16A and 16B are subjected to edge line processing so as to be energized through the plurality of wires 13. In other words, the ends of the coils are brought into conduction with the solder 21 on the terminal plates 20.

As shown in FIGS. 3 and 4, a plurality of magnets 14 are attached to the yoke base 17 and the lens holder 12 is disposed such that the tracking coils 15 or the focusing coils 16A and 16B face the magnets 14. The magnets 14, the tracking coils 15, and the focusing coils 16A and 16B constitute a magnetic circuit, and the tracking coils 15 and the focusing coils 16A and 16B are fed with magnetic fluxes from the magnets 14.

As has been discussed, the objective lens actuator 10 of the present embodiment includes the objective lens 11 for focusing a light beam on the disk 4, the lens holder 12 for holding the objective lens 11, the terminal plates 20 fixed to the lens holder 12, a fixed part (the yoke base 17 in this embodiment) for supporting the terminal plates 20 with elasticity through the plurality of wires 13, and the magnetic circuit having the magnets 14 attached to the fixed part side, the tracking coils 15 and the focusing coils 16A and 16B that are attached to the lens holder 12. Further, the lens holder 12 and the objective lens 11 can be driven by the magnetic circuit in the focusing direction and the tracking direction.

In the operations of the objective lens actuator 10 configured thus, the objective lens 11 is driven in the focusing direction of arrow Fo, the tracking direction of arrow Tr, and the radial tilting direction of arrow RAD by energizing the coils. For example, when current is applied to the focusing coil 16A and the focusing coil 16B in the same direction, the objective lens 11 is driven in the focusing direction. When the current is applied in opposite directions, the objective lens is rotationally driven in the radial tilting direction.

As shown in FIG. 6 and so on, the objective lens actuator 10 of the present embodiment has the terminal plate 20 tilted by an angle $\alpha$ of about 20° relative to the wires 13. The tilt angle $\alpha$ of the terminal plate 20 relative to the wires 13 is preferably 10° to 45°.

As has been discussed, in the objective lens actuator 10 of the present embodiment, the terminal plates 20 are diagonal to the wires 13. To be specific, the terminal plates 20 are tilted relative to the wires 13 such that portions where the solder 21 for connecting the coils is applied on the terminal plates 20 are separated from the wires 13 and portions where the solder 22 for connecting the wires is applied on the terminal plates 20 are close to or in contact with the wires 13. Thus the wires 13 and the solder 21 for connecting the coils do not spatially interfere with each other and a pitch between the wires 13 can be reduced. In other words, the solder 21 on the lands for connecting the ends of the coils and the solder 22 at the other ends of the wires 13 can be flush with each other in side view (on the same line relative to the thickness direction of the objective lens actuator 10), and a pitch between the wires 13 can be reduced. Thus the objective lens actuator 10 can be reduced in thickness in the focusing direction and can be suitable for a low-profile device.

Since the terminal plates 20 are tilted relative to the wires 13, the other ends of the wires 13 can be quite close to or in contact with edges E of the terminal plates 20 as shown in FIG. 6. Thus the effective lengths of the wires 13 are restricted at the edges E of the terminal plates 20. The solder 22 reaches only the edges E at the portions of the edges E even when the amount of the solder 22 varies as indicated by a broken line in FIG. 6, so that the wires 13 are hardly varied in effective length. As a result, it is possible to reduce tilts occurring during the driving of the moving part including the lens holder 12 and thus the objective lens actuator 10 hardly reduces the aberration of a light beam spot.

As has been discussed, in the objective lens actuator 10 of the present embodiment, the terminal plates 20 are tilted only by a predetermined angle relative to the wires 13 and are fixed to the lens holder 12, and the plurality of wires 13 are fixed at the edges of the terminal plates with the solder 22 serving as a fixing agent.

Further, as has been discussed, the tilt angle $\alpha$ of the terminal plates 20 relative to the wires 13 is at least 10°, thereby preventing a reduction in operating efficiency and the occurrence of problems. In other words, when the tilt angle $\alpha$ is less than 10° on the terminal plates 20 having the solder 21 for connecting the ends of the coils, the other ends of the wires 13 and the solder 21 for connecting the coils may come into contact with each other or may be close to each other, so that it may become difficult to cut unnecessary portions thereafter at the other ends of the wires 13 and the workability may decline. Alternatively, the solder 21 for connecting the coils and the other ends of the wires 13 may come into contact with each other, so that positions for connecting the wires 13 and the terminal plates 20 may be displaced and problems may occur. When the tilt angle $\alpha$ is at least 10° on the terminal plates 20, such problems can be prevented.

When the tilt angle $\alpha$ of the terminal plates 20 is 45° or less relative to the wires 13, the wires 13 and the terminal plates 20 can be reliably connected to each other with the solder 22. In other words, when the tilt angle $\alpha$ of the terminal plates 20 is larger than 45° relative to the wires 13, the solder 22 protruding on the tilted terminal plates 20 may cover the wires 13 with an extremely small area or the solder 22 and the wires 13 may not come into contact with each other, whereas when the tilt angle $\alpha$ is 45° or less, it is possible to prevent such problems and keep high reliability.

As has been discussed, in the objective lens actuator 10 of the present embodiment, the terminal plates 20 are fixed to the lens holder 12 while being tilted by 10° to 45° relative to the wires 13, and the plurality of wires 13 are fixed at the edges of the terminal plates 20 with a fixing agent. In the objective lens actuator 10 of the present embodiment, the fixing agent is solder.

In the foregoing embodiment, the fixed part to which one end of each of the wires 13 is connected is made up of the yoke base 17. The present invention is not limited to this configuration as long as a part to be moved (moving part) and including the lens holder 12 and the objective lens 11 can be supported by the fixed part through the wires 13 so as to move relative to the fixed part. Further, the fixed part may be the base of the optical pickup device 7 as long as the fixed part can movably support the moving part.

Moreover, in the foregoing embodiment, the magnets 14 are attached to the fixed part side and the tracking coils 15 and the focusing coils 16A and 16B are attached to the moving part side including the lens holder 12. The present invention is not limited to this configuration. The tracking coils 15 and the focusing coils 16A and 16B may be attached to the fixed part side and the magnets 14 may be attached to the moving part side including the lens holder 12.

Further, in the foregoing embodiment, the fixing agent for fixing the wires 13 and the terminal plates 20 is the solder 22. By using solder as the fixing agent, it is possible to achieve highly stable long-term performance even at a high temperature and a high humidity and easily use the fixing agent. The present invention is not limited to this configuration. The fixing agent may be any conductive fixing agent having adhesion and electrical continuity or an adhesive made of a polymeric material.

The objective lens actuator of the present invention is not limited to the objective lens actuator of an optical disk drive. The present invention is also applicable to a lens actuator used for a precise optical instrument and is useful for an optical precision instrument such as a camera and a microscope which require tracking of a lens position with high accuracy.

What is claimed is:

1. An objective lens actuator comprising:
    an objective lens for focusing a light beam on a disk;
    a lens holder for holding the objective lens;
    terminal plates fixed to the lens holder;
    a fixed part; and
    a plurality of straight wires each having one end fixed to one of the terminal plates with a fixing agent and an other end fixed to the fixed part,
    wherein the terminal plates are fixed to the lens holder while being tilted by an angle in a range of 10 degrees to 45 degrees relative to the wires, and the plurality of wires are fixed at edges of the terminal plates with the fixing agent.

2. The objective lens actuator according to claim 1, wherein the fixing agent is solder.

3. The objective lens actuator according to claim 1, further comprising a magnet circuit made up of magnets provided on one of the fixed part and the lens holder and coils provided on an other of the fixed part and the lens holder, the magnet circuit being able to drive the lens holder in a focusing direction and a tracking direction.

* * * * *